United States Patent [19]

Isaksson et al.

[11] Patent Number: 6,160,820

[45] Date of Patent: Dec. 12, 2000

[54] MULTI-CARRIER TRANSMISSION SYSTEMS

[75] Inventors: Mikael Isaksson; Magnus Johansson; Harry Tonvall; Lennart Olsson; Tomas Stefansson; Hans Ohman; Gunnar Bahlenberg; Anders Isaksson; Goran Okvist; Lis-Marie Ljunggren; Tomas Nordstrom; Lars-Ake Isaksson; Daniel Bengtsson; Siwert Hakansson; Ye Wen, all of Lulea, Sweden

[73] Assignee: Telia AB, Fastra, Sweden

[21] Appl. No.: 09/147,755

[22] PCT Filed: Sep. 1, 1997

[86] PCT No.: PCT/SE97/01461

§ 371 Date: Jun. 14, 1999

§ 102(e) Date: Jun. 14, 1999

[87] PCT Pub. No.: WO98/10556

PCT Pub. Date: Mar. 12, 1998

[30] Foreign Application Priority Data

Sep. 2, 1996 [SE] Sweden ................................. 96031984

[51] Int. Cl.[7] ........................................................ H04J 1/00
[52] U.S. Cl. ............................................. 370/480; 370/294
[58] Field of Search ..................................... 370/480, 486, 370/294, 295, 489; 379/93.02; 375/346, 260, 257, 285

[56] References Cited

U.S. PATENT DOCUMENTS 5,838,667  11/1998  Bingham et al. ........................ 370/294
6,014,412  1/2000  Wise et al. .............................. 375/346

OTHER PUBLICATIONS

William Y. Zou, et al., IEEE Transactions on Broadcasting, vol. 41, No. 1, pp. 1–8, "COFDM: An Overview", Mar. 1995.

Primary Examiner—Wellington Chin
Assistant Examiner—Prenell P. Jones
Attorney, Agent, or Firm—Oblon, Spivak, McClelland, Maier & Neustadt, P.C.

[57] ABSTRACT

A multi-carrier transmission system, particularly a discrete multi-tone (DMT) system. Data is transmitted between two transceivers using a plurality of carriers. The frequency bandwidth of the system is divided between the plurality of carriers. The transmission system is adapted for operation in a heterogeneous network including a number of subscriber equipments having different channel characteristics and coexisting on the same cable. The length of cable for each subscriber terminal varies in relation to its respective location. The transmission system includes an allocation device for allocating the traffic of subscriber equipments having a shorter length of cable to tones starting from a higher frequency band of the system bandwidth.

17 Claims, 4 Drawing Sheets

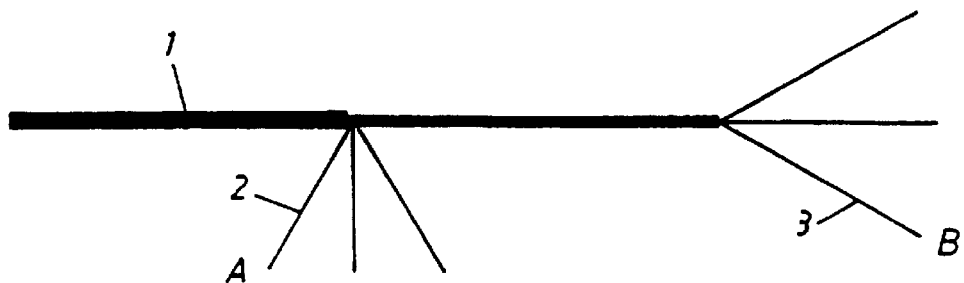
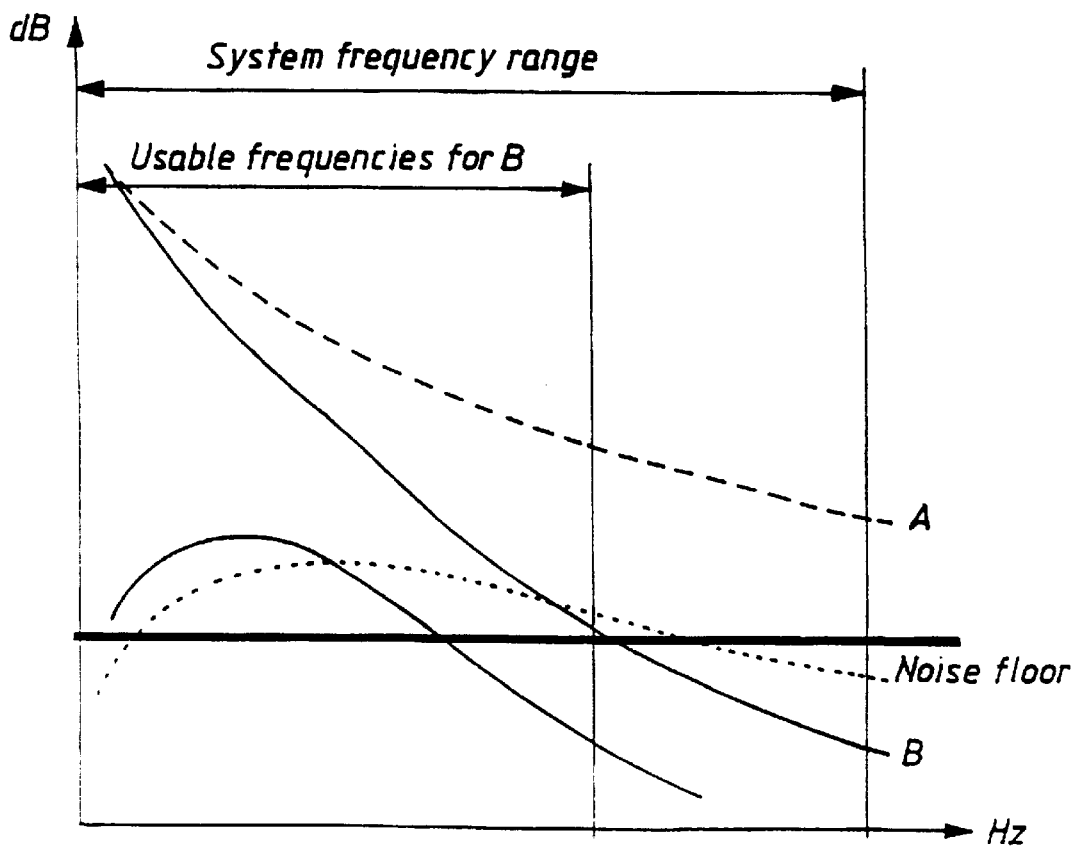

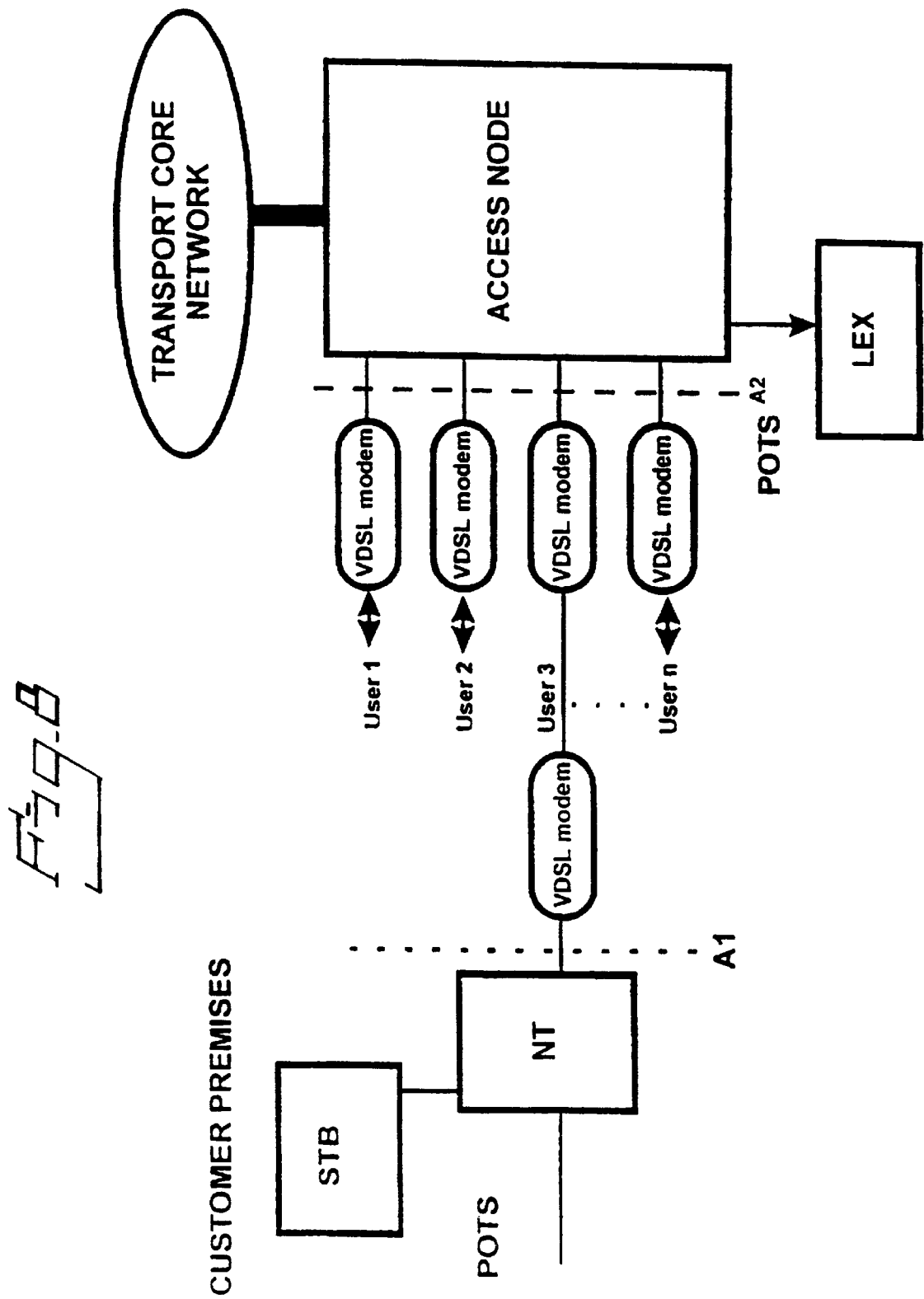

MULTI-CARRIER TRANSMISSION SYSTEMS

BACKGROUND OF THE INVENTION

Field of the Invention

The invention relates to multi-carrier transmission systems and, in particular, a method for the allocation of tones in such systems, and a heterogeneous telecommunications network including a multi-carrier transmission system.

DISCUSSION OF THE BACKGROUND

The demand for provision of multi-media and other bandwidth services over telecommunications networks has created a need to transmit high bit rate traffic over twisted copper pairs. This requirement has led to the development of a number of different transmission schemes, such as, ADSL and VDSL. One of the more likely modulation systems for all these transmission schemes is DMT, which bears some resemblance to orthogonal frequency division multiplex, and is a spread spectrum transmission technique.

In discrete multi-tone transmission, the available bandwidth is divided into a plurality of sub-channels each with a small bandwidth, 4 kHz perhaps. Traffic is allocated to the different sub-channels in dependence on noise power and transmission loss in each sub-channel. Each channel carries multi-level pulses capable of representing up to 11 data bits. Poor quality channels carry fewer bits, or may be completely shut down.

Because inter pair interference in copper pair cables is higher where data is transmitted in both directions, i.e. symmetric duplex, the use of asymmetric schemes has been proposed in which high data rates are transmitted in one direction only. Such schemes meet many of the demands for high bandwidth services, such as, video-on-demand but, in the long term, symmetric duplex systems will be required.

VDSL (Very high bit-rate Digital Subscriber Lines) technology resembles ADSL to a large degree, although ADSL must cater for much larger dynamic ranges and is considerably more complex as a result. VDSL is lower in cost and lower in power, and premises VDSL units need to implement a physical layer media access control for multiplexing upstream data.

Four line codes have been proposed for VDSL:

CAP; Carrierless AM/PM, a version of suppressed carrier Quadrature Amplitude Modulation (QAM), for passive Network termination (NT) configurations, CAP would use QPSK upstream and a type of Time Division Multiple Access (TDMA) for multiplexing (although CAP does not preclude a Frequency Division Multiplexing (FDM) approach to upstream multiplexing);

DMT; Discrete Multi-Tone, a multi-carrier system using Discrete Fourier Transforms to create and demodulate individual carriers, for passive NT configurations; DMT would use FDM for upstream multiplexing (although DMT does not preclude a TDMA multiplexing strategy);

DWMT; Discrete Wavelet Multi-Tone, a multi-carrier system using Wavelet Transforms to create and demodulate individual carriers, DWMT also uses FDM for upstream multiplexing, but also allows TDMA; and SLC; Simple Line Code, a version of four-level baseband signalling that filters the base band and restores it at the receiver, for passive NT configurations; SLC would most likely use TDMA for upstream multiplexing, although FDM is possible.

Early versions of VDSL will use frequency division multiplexing to separate downstream from upstream channels and both of them from POTS and ISDN. Echo cancellation may be required for later generation systems featuring symmetric data rates. A rather substantial distance, in frequency, will be maintained between the lowest data channel and POTS to enable very simple and cost effective POTS splitters. Normal practice would locate the downstream channel above the upstream channel. However, the DAVIC specification reverses this order to enable premises distribution of VDSL signals over coaxial cable systems.

Modern multi-carrier techniques using orthogonal carriers with high order QAM constellations for the transmission of a plurality of bits per carrier and symbol, use some method for the determination of an inverse channel model to be used in an equalization process. In the frequency domain, this is normally based on an estimate of the channel attenuation and phase for each carrier.

In a heterogeneous network, a number of users with different channel characteristics will coexist on the same cable and there is a need, with such networks, to be able to utilize the capacity of the network in a manner whereby coverage is optimized.

SUMMARY OF THE INVENTION

It is an object of the present invention to provide a multi-carrier transmission systems operating in a heterogeneous network and adapted to utilize the capacity of the network in a manner whereby coverage is optimized.

It is another object of the present invention to provide a method for the allocation of tones in a multi-carrier transmission system operating in a heterogeneous network. This method will not only enable the capacity of the network to be utilized in a manner whereby coverage is optimized, but will also enable the number of subscribers, covered by a VDSL system, to grow.

It is a further object of the present invention to provide a heterogeneous telecommunications network including a multi-carrier transmission system.

The present invention provides a multi-carrier transmission system in which data is transmitted between two transceivers using a plurality of carriers, the frequency bandwidth of the system being divided between said plurality of carriers, said transmission system being adapted for operation in a heterogeneous network including a number of subscriber equipments having different channel characteristics and coexisting on the same cable, the length of cable for each subscriber terminal varying in dependence on their respective locations, characterized in that said transmission system includes allocation means for allocating the traffic of subscriber equipments having a shorter length of cable to tones starting from a higher frequency band of said system bandwidth thereby reducing interference in a lower frequency band and giving an improved signal-to-noise ratio on tones, above a noise level of the system, allocated by said allocation means, to subscriber equipments having relatively longer lengths of cable. The usable frequency band of said system bandwidth for subscriber equipments having relatively longer lengths of cable may be determined by said noise level of the system.

The present invention also provides a heterogeneous network including a multi-carrier transmission system as outlined in preceding paragraphs.

The present invention further provides a heterogeneous network including a number of subscriber equipments having different channel characteristics and coexisting on the same cable, the length of cable for each subscriber terminal varying in dependence on their respective locations; and a multi-carrier transmission system in which data is transmitted between two transceivers using a plurality of carriers, the frequency bandwidth of the system being divided between said plurality of carriers, characterized in that said transmission system includes allocation means for allocating the traffic of subscriber equipments having a shorter length of cable to tones starting from a higher frequency band of said system bandwidth thereby reducing interference in a lower frequency band and giving an improved signal-to-noise ratio on tones, above a noise level of the system, allocated by said allocation means to subscriber equipments having relatively longer lengths of cable. The usable frequency band of said system bandwidth for subscriber equipments having relatively longer lengths of cable is determined by said noise level of the system.

The allocation means may be adapted to operate in accordance with a tone allocation algorithm which may operate independently of the order in which said subscriber equipments, having shorter and longer lengths of cable connections, use said network.

The present invention further provides, in a heterogeneous network including a number of subscriber equipments having different channel characteristics and coexisting on the same cable, the length of cable for each subscriber terminal varying in dependence on their respective locations; and a multi-carrier transmission system in which data is transmitted between two transceivers using a plurality of carriers, the frequency bandwidth of the system being divided between said plurality of carriers, a method for the allocation of tones in said multi-carrier transmission system, characterized by allocating the traffic of a subscriber terminal having a shorter length of cable to tones starting from a higher frequency band of said system bandwidth thereby reducing interference in a lower frequency band and giving an improved signal-to-noise ratio on tones, above a noise level of the system, allocated to a subscriber terminal having a longer length of cable. The usable frequency band of said system bandwidth for subscriber equipments having longer lengths of cable may be determined by said noise level of the system.

The invention further provides a method for the allocation of tones in a DMT transmission system operating in a heterogeneous network, characterized by network users, having cable connections shorter in length than cable connections of other users, allocating their traffic to tones starting from high frequencies of said transmission system's frequency bandwidth thereby reducing, in a mixed network, interference in a low frequency band of said system frequency bandwidth and giving network uses, having relatively longer cable connections, an improved SNR on the tones available above a noise level of the DMT system.

The tone allocation process may be effected in accordance with a tone allocation algorithm which may operate independently of the order in which said subscriber equipments, having shorter and longer lengths of cable connections, use said network.

The multi-carrier transmission system may be a DMT transmission system.

The multi-carrier transmission system may be a DMT based VDSL system.

The system bandwidth may be 10 MHz and may be divided into 1024 carriers each having a width of 9.77 kHz.

BRIEF DESCRIPTION OF THE DRAWINGS

The foregoing and other features of the present invention will be better understood from the following description with reference to the accompanying drawings, in which:

FIG. 4 diagrammatically illustrates the cable section of a heterogenous (multimedia) network;

FIG. 5 illustrates, graphically, attenuation curves for the network of FIG. 4;

FIG. 8 illustrates, in schematic form, a network overview for a VDSL modem application network interface.

DETAILED DESCRIPTION OF THE PREFERRED EMBODIMENTS

To facilitate an understanding of the present invention, a glossary of the abbreviations used in this patent specification are set out below:

ADC: Analog-to-Digital Converter
DAC: Digital-to-Analog Converter
DMT: Discrete Multi Tone
DWMT: Discrete Wavelet Multi-Tone
FFT: Fast Fourier Transform
FITN: Fiber To The Node
MUSIC: MUlti-carrier System for the Installed Copper network
IFFT: Inverse Fast Fourier Transform
ISDN: International Standard for Digital Networks
NT: Network Termination
NU: Network Unit
POTS: Plain Old Telephony Service
QAM: Quadrature Amplitude Modulation
SDH: Synchronous Digital Hierarchy
SNR: Signal-to-Noise Ratio
TDMA: Time Division Multiple Access
VDSL: Very high bit-rate Digital Subscriber Lines The system, to which the present invention generally relates, is for convenience referred to as MUSIC—MUlti-carrier-System for the Installed Copper network. MUSIC is intended to provide high-speed communication on telephone twisted copper wire pairs for supporting broadband multimedia services.

The MUSIC system is adapted to offer a cost-effective robust customer implementation in silicon, providing 26:2 or 13:2 Mbps asymmetric transmission over copper cables (<1300 meters) for use on existing local telephony networks.

The MUSIC system can be accessed using the network concept known as Fiber To The Node (FITN), using optical fibers, each serving many users, up to a cabinet near the users' homes. Thus, the cable length specification for MUSIC can be successfully limited to 1300 meters.

The MUSIC system is primarily intended for the transmission of a high (26 Mbps) bit-rate signal downstream to the subscriber and a low (2 Mbps) bit-rate signal upstream, from the subscriber.

Figure 1:
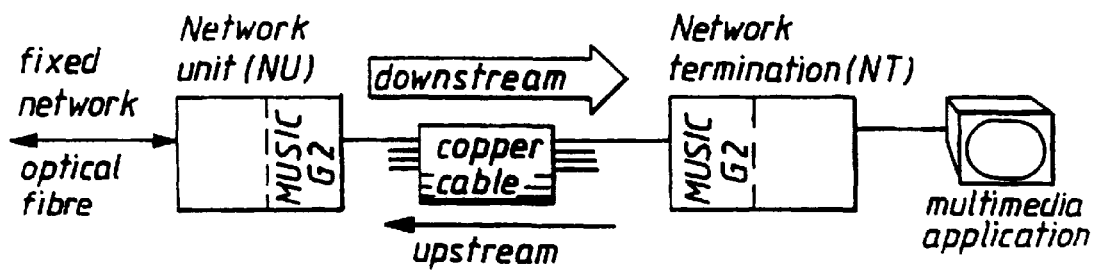
FIG. 1 illustrates, in schematic form, an asymmetric communications system.

FIG. 1 illustrates the MUSIC system. A network unit, NU, is connected to the fixed network by an optical fiber link, (FITN). A network termination, NT, connected to a multimedia application, e.g. video on demand, is linked to the NU via copper cable. The MUSIC system supports a high down stream data rate and a much lower up stream data rate.

In the MUSIC system, described herein, two fixed bit rates (13:2, 26:2 Mbps) are supported, the lower bit rate, 13:2 Mbps, can be implemented as an extra option for use with poor, or extremely long, copper cables.

For the network termination (NT), the connection consists of a set of standard interfaces, such as, POTS, ISDN, ATM 25 and Ethernet. All transfer protocols are carried by the modem data stream, except for the POTS service, which is passively filtered out so that it is independent of modem status. The network unit (NU) terminates in the fixed network.

MUSIC separates the up and down-link spectra by passive filtering in the analog parts.

The version of MUSIC, described herein, is intended to allow for future functionality upgrades.

Figure 2:
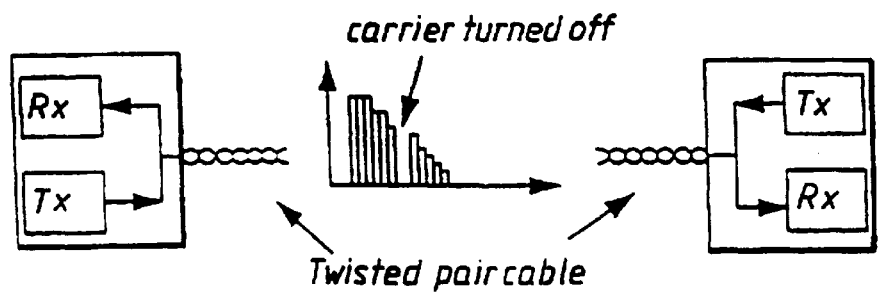
FIG. 2 illustrates, in schematic form, a DMT system.

The MUSIC system is a DMT-based, multi-carrier, VDSL system, using Discrete Fourier Transforms to create and demodulate individual carriers. This is illustrated in FIG. 2, which shows two transceivers each of which has a receiver, Rx, and a transmitter, Tx, connected to a twisted copper pair. Data is transmitted between the two transceivers using a plurality of carriers, some of which may not be used, e.g. where channel quality is extremely poor. The number of bits conveyed by each carrier may also vary, depending on channel quality.

A multi-carrier modulation technique, i.e. DMT, handles frequency dependent loss and noise in twisted pair-cables in an efficient manner. In the MUSIC system, the available 10 MHz bandwidth is divided into 1024 carriers each of which is 9.77 kHz wide. The allocated transmission power for the individual carriers depends on the noise power and the transmission loss in each band. Every carrier carries multi-level pulses that can represent up to 12 bits of data (4096 QAM). The individual carrier's signal-to-noise ratio (SNR) is calculated on the receiver side. If a carrier has a high SNR, up to 12 bits are placed on that carrier. For carriers with low SNR values, fewer bits are placed on the carrier. Carriers affected by narrow band interferers are turned off. Forward error correction and data interleaving is used to mitigate the effects of occasional bursts of impulse noise.

Figure 3:
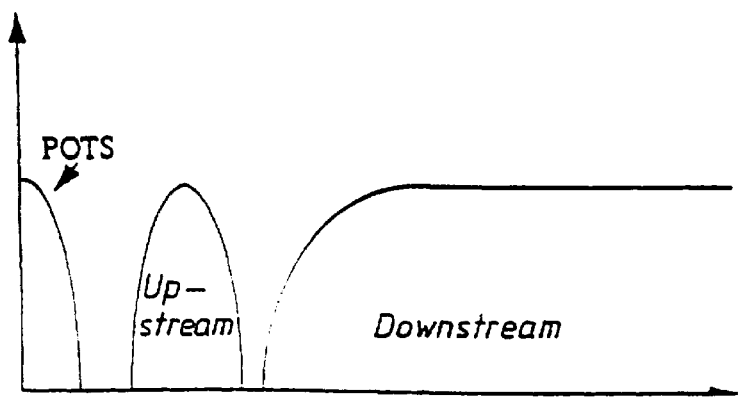
FIG. 3 illustrates, graphically, the channel separations used in an asymmetric DMT transmission system.

Asymmetric VDSL is implemented in this version of the MUSIC system, which means that the downstream rate is much higher than the upstream rate. Two fixed downstream rates (26/13 Mbps) are supported by the system, the chosen rate depends on the actual cable length (<1300 meters) and/or the quality of the channel. The upstream rate is fixed at 2 Mbps. Different frequency bands can be used in the MUSIC system to separate the downstream channel from upstream channel and both from POTS, see FIG. 3.

Alternatively, other duplex methods can be used, for example, TDMA and/or a method where every other carrier is dedicated for the downstream and upstream channel.

It will be seen from FIG. 4 of the accompanying drawings, which diagrammatically illustrates the cable section of a heterogeneous network, i.e a multi-carrier system, such as MUSIC, which is intended to provide high-speed communication on telephone copper wire pairs for supporting broadband multimedia services. As shown in FIG. 4, the cable 1 of the heterogeneous (multimedia) network is a multi-core cable, each core of which is a twisted pair of copper cables, for example, the copper wire pairs 2 and 3, respectively for users (subscribers) 'A' and 'B' of the network. Thus, subscribers 'A' and 'B', are connected to the network by means of cables of different lengths, i.e. the length of the cable 3, for subscriber 'B' is longer that the length of cable 2, for subscriber 'A'.

As shown by the attenuation curves of FIG. 5 of the accompanying drawings, the shorter length of cable 2 for subscriber 'A' has less attenuation in the higher frequency band of the system frequency range, or bandwidth, than the longer length of cable 3 for subscriber 'B'.

Figure 6:
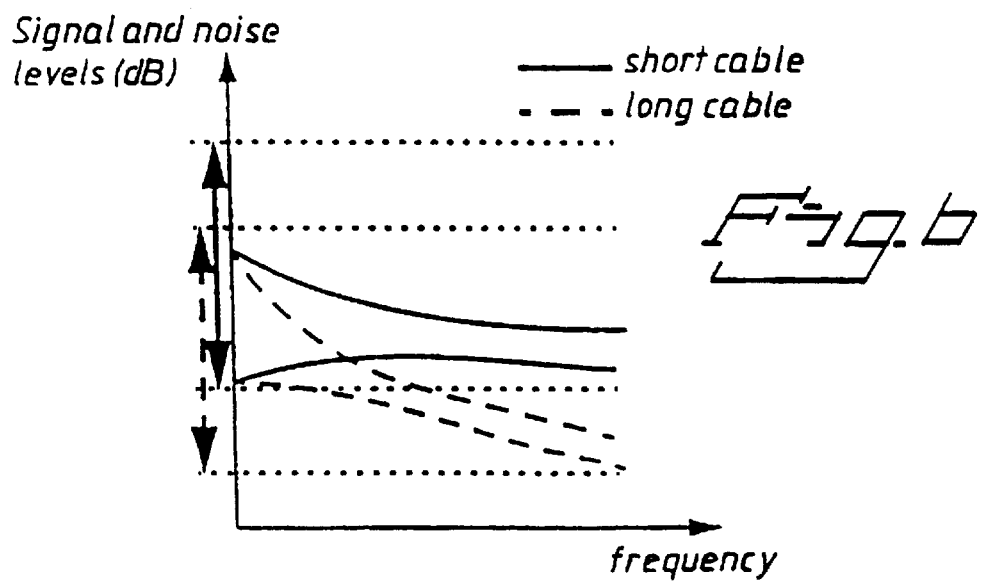
FIG. 6 illustrates, in graphical form, the dependence of signal-to-noise ratio on frequency for a DMT system.

It will also be seen from FIG. 6 which illustrates, in graphical form, the dependence of signal-to-noise ratio (SNR) on frequency for a multi-tone carrier transmission system, that the shorter length of cable 2 has less attenuation in the higher frequency range than the longer length of cable 3. This means that, for shorter length cables, an occasional pulse may appear in the system's receiver almost unchanged. Hence, a relatively large dynamic range in the receiver is required. However, this can be readily achieved since almost uniform attenuations do not require a large dynamic range. The ADC (Analog-to-Digital Converter) needs to accommodate the region indicated in FIG. 6 by the heavy solid arrowed line.

The larger high frequency attenuations of longer length cables does, however, require a large dynamic range in the receiver. The high frequency attenuation also means that it would take several large peaks from a transmitter in order to build up high amplitudes in the receiver, a case which is even less likely to occur at the ADC input than single peaks. The headroom can, therefore, be decreased by the heavy dashed arrowed line, in FIG. 6.

Thus, in practice, performance can be optimized by carefully setting the signal level at the receiver ADC in dependence on cable length.

It will be seen from the foregoing that the shape of the curves in FIG. 5 are, in essence, the result of two effects, namely, attenuation and the interference generated by other users in the same cable (see FIG. 4).

The capacity of the cable of FIG. 4 is the area between the two curves, illustrated in FIG. 5, for each of the subscribers 'A' and 'B', i.e. the dotted curves for subscriber 'A' and solid curves for subscriber 'B', lying above the noise floor, i.e. a noise level of the system, and within the frequency bandwidth of the system.

The usable frequency range for subscriber 'B' is less than the usable frequency range for subscriber 'A'.

In accordance with the present invention, a method is provided for the allocation of tones in a DMT system operating in a heterogeneous network, for example, a mixed (multimedia) network employing VDSL. This method will not only enable the capacity of the heterogeneous network to be utilized in a manner whereby coverage is optimized, but will also enable the number of subscribers, covered by a VDSL system, to grow.

As stated above, a DMT-based VDSL system is a multi-carrier system using Discrete Fourier Transforms to create and demodulate individual carriers. A modulation technique, such as DMT, can handle frequency dependent loss and noise in twisted pair-cables in an efficient manner.

Figure 7:
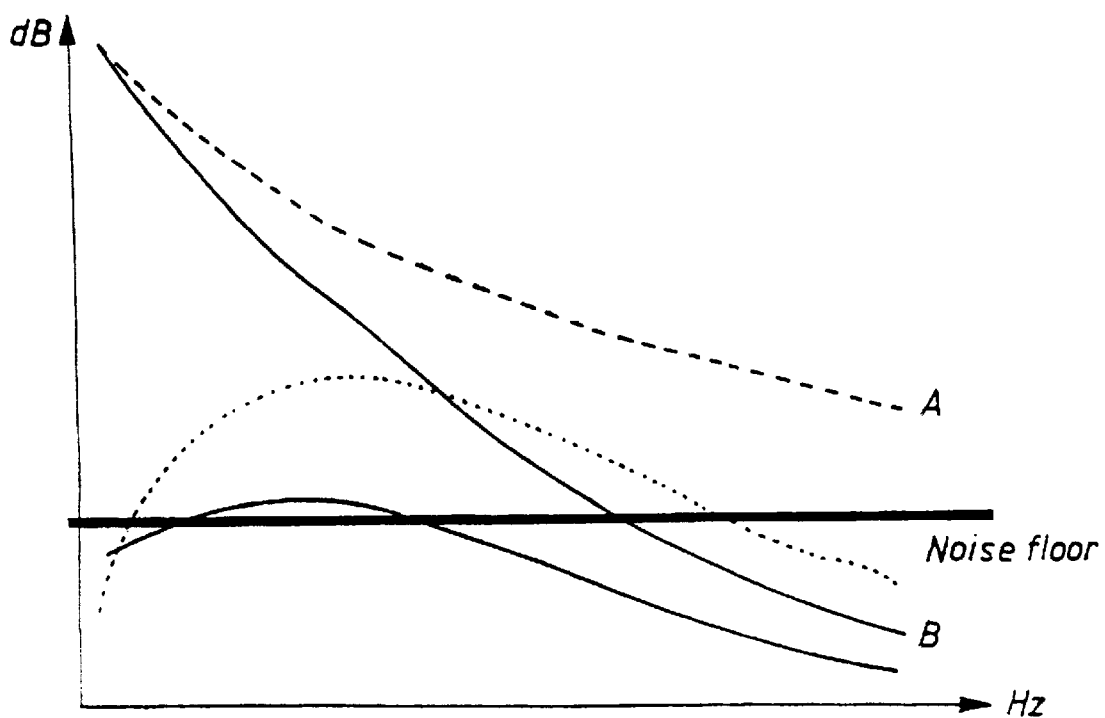
FIG. 7 illustrates, graphically, attenuation curves for the network of FIG. 4, operating in accordance with the present invention.

In accordance with the method of tone allocation, subscribers, such as subscriber 'A', with short cable lengths will allocate their traffic to tones starting from the high frequencies. The effect of this, in a heterogeneous network, is that interference in the low frequency band will be reduced thereby giving subscriber 'B', i.e. subscribers with longer cable lengths, a better signal-to-noise ratio (SNR) on the tones available above the noise floor. This effect is shown in FIG. 7 of the accompanying drawings.

Thus, the algorithm used for the tone allocation method is adapted to allocate tones, with the given system margin, starting from the highest frequency and thus cover longer cables.

Use of the tone allocation algorithm is not time related, i.e. there is no temporal aspect of the algorithm, and, as a consequence of this, the allocation process will operate in the same way regardless of the time at which the network is used by subscribers 'A' and 'B'.

In other words, allocation means, forming part of the multi-carrier transmission system, are adapted to operate in accordance with a tone allocation algorithm which operates independently of the order in which the subscribers 'A' and 'B', respectively having shorter and longer lengths of cable connections, use the heterogeneous, or multimedia, network.

It will, therefore, be seen from the foregoing that a multi-carrier transmission system, such as a DMT system, in which data is transmitted between two transceivers using a plurality of carriers, and in which the frequency bandwidth of the system is divided between the plurality of carriers, is adapted for operation in a heterogeneous network and to utilize the capacity of the network in a manner whereby coverage is optimized.

It will also be seen that in a heterogeneous network including a number of subscriber equipments having different channel characteristics and coexisting on the same cable, in which the length of cable for each subscriber terminal varies in dependence on their respective locations, the multi-carrier transmission system uses allocation means for allocating the traffic of subscriber equipments having a shorter length of cable to tones starting from a higher frequency band within the system bandwidth thereby reducing interference in a lower frequency band and giving an improved signal-to-noise ratio on tones, above a noise level of the system, allocated by said allocation means, to subscriber equipments having relatively longer lengths of cable. In essence, the usable frequency band of the system bandwidth for subscriber equipments having relatively longer lengths of cable is determined by the system noise level.

The multi-carrier transmission system is preferably a DMT based VDSL system having a bandwidth of 10 MHz divided into 1024 carriers each having a width of 9.77 kHz.

In a mixed (multimedia) network employing VDSL, the VDSL modem can interface different network elements, depending on the physical location of the modem, i.e. at the access node premises, or at the customer premises. At the customer premises, the VDSL modem can interface an active network termination equipment. At the access node, the VDSL modem will interface an access specific interface, see FIG. 8, which shows a logical view of the network's elements that interface the VDSL modem.

The VDSL modem may be integrated physically with the network termination equipment, and the VDSL modem, at the access node, may be physically situated in the cabinet in which the access node is located.

The NT (interface A1) and the Access Node (interface A2) demand a layer 1 frame format from the VDSL modem. Integrated in the layer 1 frame are, apart from the frame header and payload, a number of information fields for management and control information. These management and control fields include different alarm indicators such as SDH alarms, for example, AIS (valid only if SDH is taken all the way to the customer premises) bit error rate measurements for performance monitoring, indications of whether synchronization is bad, or lost, equipment handling alarms for power loss and high temperature etc. The management fields also include activation for different loop tests on the modem, for operation and maintenance purposes.

What is claimed is:

1. A multi-carrier transmission system comprising:

a central transceiver;

a remote transceiver connected to said central transceiver by a cable;

a communication channel for communicating between the central transceiver and the remote transceiver via the cable, said communication channel having a frequency bandwidth in which a plurality of carriers, each having a unique carrier frequency being disposed in separate portions of said frequency bandwidth, said communication channel being configured to allow simultaneous asymmetrical upstream and downstream communication by separating upstream frequencies from downstream frequencies; and means for allocating a unique carrier frequency of the plurality of carriers for communicating between the central transceiver and the remote transceiver according to a length of the cable between the central transceiver and the remote transceiver where a value of the frequency that is allocated varies inversely with the length of the cable.

2. The system of claim 1, wherein:

a usable frequency range of the frequency bandwidth is determined by a noise level of the system.

3. The system of claim 1, further comprising:

a tone allocation mechanism that allocates tones for said means for allocating.

4. The system of claim 3, wherein:

said tone allocation mechanism is configured to work independently of an order in which users are using the system.

5. The system of claim 1, wherein:

the system being a discrete multitone transmission system.

6. The system of claim 1, wherein:

the system being a discrete multitone-based very high bit-rate digital subscriber line transmission system.

7. The system of claim 1, wherein:

the frequency bandwidth being at least 10 MHz.

8. The system of claim 7, wherein:

the frequency bandwidth being divided into 1024 carrier slots, each having a bandwidth of 9.77 kHz.

9. A heterogeneous network comprising:

a plurality of central transceivers connected to a fixed network;

a plurality of subscriber terminals, having various channel characteristics;

a plurality of remote transceivers each connected to one of the plurality of subscriber terminals;

a multiconductor cable including a plurality of conductor pairs, each of the conductor pairs being configured to make a connection, of a predetermined length, between one of the plurality of central transceivers and one of the plurality of remote transceivers; and a multi-carrier transmission system including, a communication channel via the multiconductor cable from the plurality of central transceivers to the plurality of remote transceivers having a frequency bandwidth in which a plurality of carriers, each having a unique carrier frequency being disposed in separate portions of said frequency bandwidth, said communication channel being configured to allow simultaneous asymmetrical upstream and downstream communication by separating upstream frequencies from downstream frequencies, and means for allocating a unique carrier frequency of the plurality of carriers for communicating between one of the plurality of central transceivers and one of the plurality of remote transceivers according to a length of the connection therebetween, where a value of the frequency that is allocated varies inversely with the length of the cable.

10. The network of claim 9, wherein:

a usable frequency range of the frequency bandwidth is determined by a noise level of the network.

11. The network of claim 9, further comprising:

a tone allocation mechanism that allocates tones for said allocating means.

12. The network of claim 11, wherein:

said tone allocation mechanism is configured to work independently of an order in which users are using the network.

13. The network of claim 9, wherein:

the multi-carrier transmission system being a discrete multitone transmission system.

14. The network of claim 9, wherein:

the multi-carrier transmission system being a discrete multitone-based very high bit-rate digital subscriber line transmission system.

15. The network of claim 9, wherein:

the frequency bandwidth being at least 10 MHz.

16. The network of claim 15, wherein:

the frequency bandwidth is divided into 1024 carrier slots, each having a bandwidth of 9.77 kHz.

17. A method of allocating tones in a multi-carrier transmission system, comprising the steps of:

dividing an available bandwidth into non-overlapping discrete subchannels;

sorting by frequency the non-overlapping channels in descending order;

determining respective path lengths of cable between pairs of a central transceiver and a corresponding remote transceiver;

sorting the path lengths of cable from the determining step in ascending order; and allocating the discrete subchannels, starting at a highest frequency identified in the sorting by frequency step to a shortest path length identified in the sorting the path length step.

* * * * *